Sept. 2, 1969 W. FISHBEIN ET AL 3,465,336
DOPPLER RADAR WITH CLUTTER CONTROLLED FILTER CHANNEL
Filed May 9, 1968 2 Sheets-Sheet 2
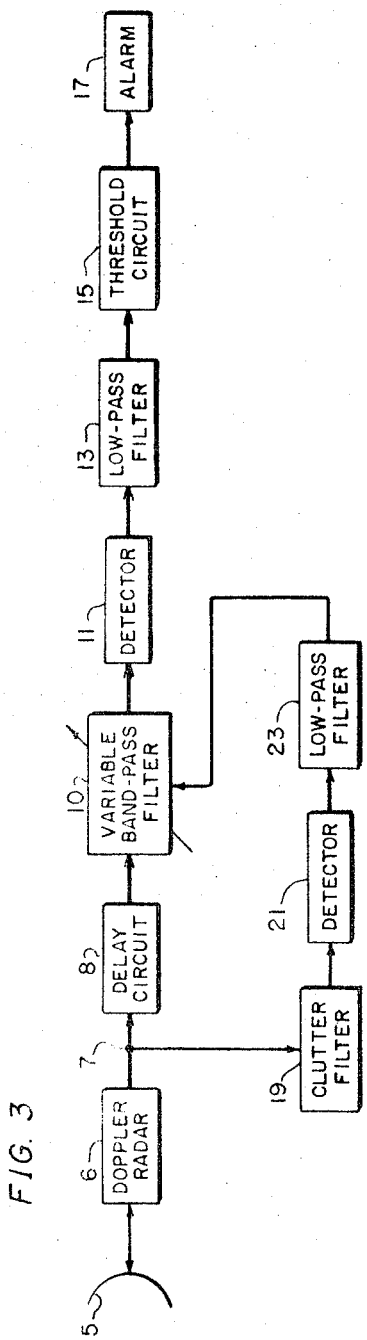
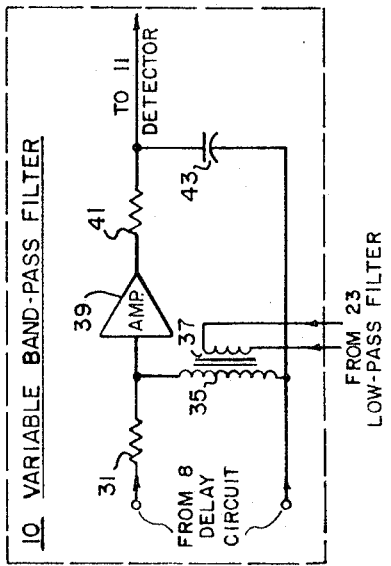
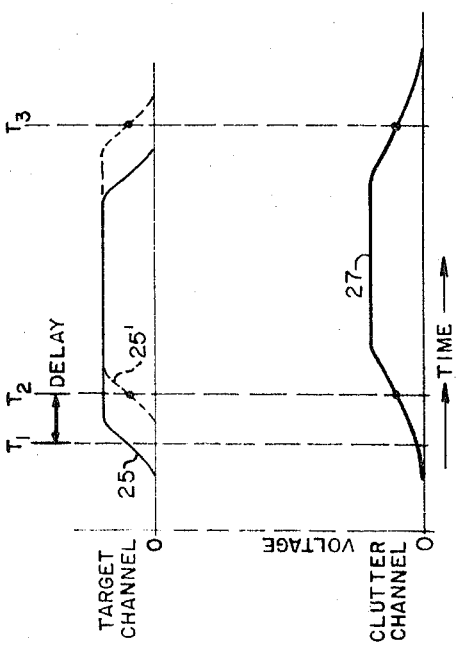
INVENTORS,
WILLIAM FISHBEIN &
OTTO E. RITTENBACH.

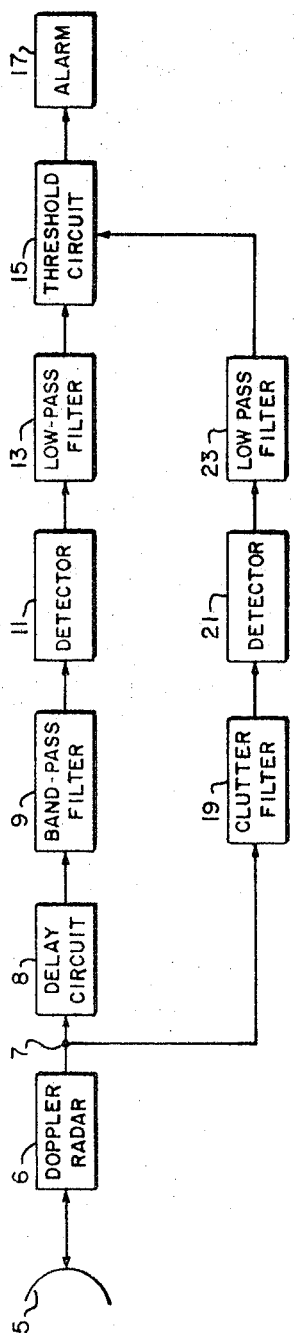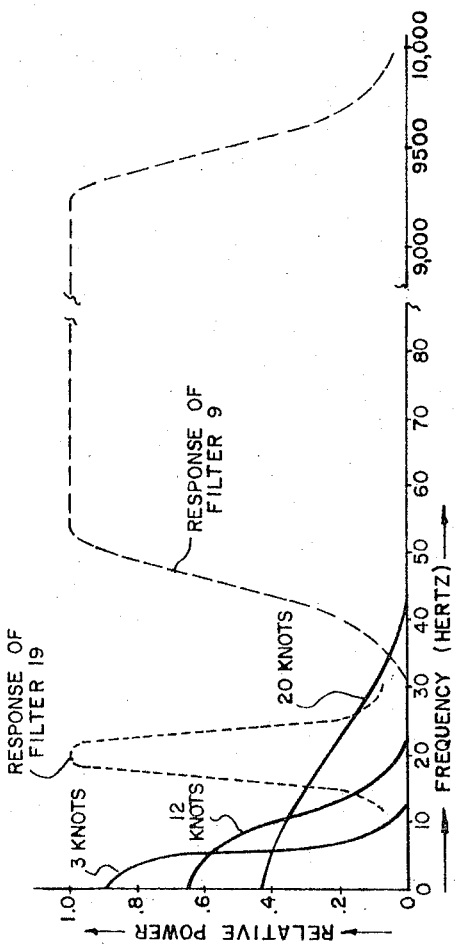

United States Patent Office 3,465,336
Patented Sept. 2, 1969

3,465,336
DOPPLER RADAR WITH CLUTTER CONTROLLED FILTER CHANNEL
William Fishbein, Elberon, and Otto E. Rittenbach, Neptune, N.J., assignors to the United States of America as represented by the Secretary of the Army
Filed May 9, 1968, Ser. No. 728,016
Int. Cl. G01s 9/42
U.S. Cl. 343—7.7                                    2 Claims

ABSTRACT OF THE DISCLOSURE

The detected Doppler signals are applied in parallel to a target signal channel and a lower-frequency clutter control channel. The target signal channel includes an alarm which is actuated if the signal level therein exceeds the threshold of a threshold circuit. The output of the clutter control channel raises the threshold or reduces the bandwidth of the target signal channel, thus maintaining high sensitivity in the absence of wind-induced clutter and preventing false alarms caused by clutter in the target signal channel.

---

The invention described herein may be manufactured, used, and licensed by or for the Government for governmental purposes without the payment to us of any royalty thereon.

The present invention relates to Doppler radar sets of the type used to detect moving surface targets such as men and vehicles. When such radars are used in wooded or jungle areas, the wind-induced movement of the foliage produces Doppler clutter signals which can interfere with the detection and recognition of the desired targets. In early radars of this type, the Doppler signals were applied to earphones, which required continual monitoring by an operator. With this type of equipment skilled operators can learn to recognize different types of target and clutter signals by their distinctive sounds. Later developments eliminated the constant monitoring of the radar set by providing automatic detection systems which would actuate an alarm if a moving target appeared within the radar beam. One difficulty with such automatic systems is a reduced capability for distinguishing between desired targets and clutter compared to the continually aurally-monitored sets and the skill of the operators thereof. Wind-induced Doppler clutter signals are generally lower in frequency than the Doppler signals produced by moving men and vehicles, however high winds or brief wind gusts can produce Doppler signals of the same frequency as slowly moving men or vehicles. Filters have been inserted in the Doppler channels of such radars to block wind clutter frequencies and pass the higher frequency target signals, however if the lower frequency limit of these filters is made high enough to eliminate all wind clutter signals, some of the slower moving target signals will be lost, and if the lower limit is set low enough to include these slower moving targets, wind-induced clutter will sometimes enter the target filter and cause false alarms. The present invention comprises a Doppler radar set which overcomes these difficulties by providing an automatic Doppler detection system in which the sensitivity is automatically controlled by the amount of received clutter signal. With such an arrangement, maximum sensitivity to desired targets obtains in the absence of wind-induced clutter, and false alarms caused by wind are reduced. The circuitry includes means for applying the Doppler frequency output of the radar in parallel to a target signal channel and a clutter control channel. The target signal channel comprises a target bandpass filter followed by a detector, a low pass filter, a threshold circuit and an alarm circuit in cascade. A filter in the clutter control channel is tuned to sense the amount of wind-induced clutter below the lower frequency limit of the target bandpass filter. The detected output of this clutter filter is utilized in one embodiment to vary the threshold or sensitivity of the threshold circuit, and in another embodiment to vary the lower frequency limit of the target filter, this achieving the desired result. A delay circuit in the target signal channel compensates for the different time constants of the two filters and further reduces the probability of false alarms.

It is thus an object of this invention to provide a Doppler radar set in which the effects of wind-induced clutter signals are minimized.

A further object of the invention is to provide a Doppler radar set in which the amount of Doppler clutter below the frequency range of desired targets is continually monitored and the main Doppler target signal channel is controlled in accordance with the amount of clutter, whereby the sensitivity of the set remains high in the absence of clutter and is reduced when clutter signals fall into the frequency range of moving targets which it is desired to detect.

These and other objects and advantages of the invention will become apparent from the following description and drawings in which:

FIGURES 1 and 3 are block diagrams of two embodiments of the invention;

FIGURE 2 is a plurality of curves illustrating the operation of the illustrative circuitry;

FIGURE 4 is a diagram showing one condition of operation of the illustrated circuitry; and FIGURE 5 is a detailed circuit diagram of the bandpass filter 10 of FIGURE 3.

The Doppler radar set 6 and antenna 5 of FIGURE 1 comprise circuitry for transmitting and receiving either a pulsed or continuous wave radar beam, detecting any moving targets within said beam by known techniques to produce Doppler frequency signals indicative thereof at output lead 7. The Doppler signals are applied in parallel to a target signal channel and a clutter control channel, the former comprising delay circuit 8, bandpass filter 9, detector 11, low pass filter 13, threshold circuit 15 and alarm circuit 17, all in cascade. The clutter control channel comprises clutter filter 19, detector 21, and low pass filter 23, the output of which controls the threshold or sensitivity of circuit 15. FIGURE 2 shows in dashed lines the frequency responses of the two filters 9 and 19, as well as the amount and frequency range of wind-induced clutter for sustained winds of 3, 12 and 20 knots. It can be seen that the filter 9 has a lower half power point of about 45 Hertz and an upper half power point of about 9,500 Hertz, this being the target frequency range of interest. The lower frequency limit of 45 Hertz corresponds to a target radial velocity of approximately 2.5 kilometers/hr., for X band radar with a wavelength of approximately 3 cm. It can be seen that the Doppler clutter signals produced by winds of 12 knots or less all fall below the frequency range of the target frequency filter 9, however winds of 20 knots or more will produce Doppler clutter within the target signal frequency range. The clutter bandpass filter 19 has its center frequency at approximately 20 Hertz and a bandwidth such that clutter frequencies caused by winds which are too low to overlap the response of target filter 9 will cause negligible response in the clutter control channel. Thus, while winds of 12 knots will produce some response in the clutter control channel, the amplitude of this response is not sufficient to produce any appreciable control function. The passband of filter 19 and the gain of the clutter control channel is arranged so that any wind clutter signals of such frequency range as to overlap the target signal channel, such as the 20 knot curve illustrated, will produce the desired control function at the output of the clutter control channel. It should be noted that the foliage velocity on the average is always much lower than the wind that causes it. This accounts for the relatively low Doppler clutter frequencies caused by winds of substantial force. Returning to FIGURE 1, the target signal channel without the clutter control channel comprises a prior art type of automatic detection Doppler radar referred to above. In such a system the target Doppler frequencies of interest are selected by filter 9, rectified or detected by detector 11, converted to a smoot DC voltage by low pass filter 15 and applied to the control input of threshold circuit 15, which in the prior art had a fixed or manually adjustable threshold or sensitivity. When the output of filter 13 exceeded the threshold of circuit 15, the alarm 17 would be actuated to notify personnel in the area that the radar had picked up a moving target. In accordance with the present invention, the threshold or sensitivity of the circuit 15 is made automatically responsive to the output of the clutter control channel, so that in the presence of large amounts of wind-induced clutter, the threshold of circuit 15 is raised to de-sensitize this circuit for the duration of the clutter. Thus, during periods of little or no wind, the threshold of 15 may be such that the system is extremely sensitive to the desired targets, but during the presence of wind, the clutter which may leak into the target signal channel will not produce false alarms, since the same clutter is utilized to raise the threshold level. The detector 21 and low pass filter 23 function in the same way as the corresponding circuitry of the target signal channel. The threshold circuit 15 may comprise merely a back-biased diode, the amount of back bias determing the threshold thereof. The output of the clutter control channel would provide the variable back-bias. Such threshold circuits are shown in the Gillmer Patent 3,140,486, issued on July 7, 1964. The rest of the circuitry within the blocks of FIGURE 1 is conventional and need not be described in detail.

The purpose of the delay circuit 8 is to compensate for different transit times of the same signal through the two channels, which can cause false alarms. Since the clutter filter 19 has a lower center frequency and a smaller bandwidth than target filter 9, it will require a longer time for the energy to build up and decay in this filter than in the target channel filter 9. Thus the filter 19 acts as a delay cicuit and the delay circuit 8 is inserted to equalize the delay in both channels. This effect of a differential delay can be illustrated by the diagram of FIGURE 4. The pulses 25 and 27 represent the outputs of the two low pass filters 13 and 23 respectively in the absence of the delay circuit 8, for a wind clutter input signal of such frequency that it enters both channels. It can be seen that this clutter signal 25 in the target channel will reach the threshold circuit 15 before the same signal in the clutter control channel has had a chance to raise the threshold. Thus the leading edge of the pulse 25 will trigger a false alarm. The delay circuit 8 is given a delay of $t_2$ minus $t_1$, equal to the differential delay of the two channels in the absence of delay circuit 8, so that the same clutter signal in both channels will reach the threshold circuit simultaneously. The dashed-line curve 25′ is the delayed clutter signal of the target channel. The time delay of $t_2$ minus $t_1$ is determined from the time difference required for the two curves 25 and 27 to reach one half of the maximum voltage of each.

In the second embodiment of FIGURE 3 a threshold circuit with a fixed or manually variable threshold is utilized, as in the prior art, but the output of the clutter control channel is utilized to automatically raise the lower frequency limit of a variable bandpass filter 10 of the target signal channel in response to the presence of output from the clutter signal channel. Thus in the absence of wind-induced clutter, the low frequency cutoff of filter 10 would be the same as that of filter 9, as illustrated in FIGURE 2. Winds of 20 knots or more would generate sufficient output from the clutter control channel to automatically raise the lower frequency limit of filter 10 far enough so that the amount of wind clutter signal in the target signal channel would be reduced by such an amount that the clutter signal would not be of sufficient amplitude to overcome the threshold of circuit 15. Thus the result is the same as in the circuit of FIGURE 1, the output of the clutter channel automatically de-sensitizing the target signal channel, but accomplishing this by reducing the bandwidth thereof. The circuit elements of FIGURE 3 bearing the same reference numerals as those of FIGURE 1 perform the same function. FIGURE 5 shows in detail how the bandwidth of the filter 10 may be controlled in the desired manner. The variable bandpass filter may comprise an RL network comprising a series resistor 31 and a shunt inductor 35, which network comprises a high pass filter with a cutoff frequency which varies directly with the magnitude of the inductance of 35. Inductor 35 is part of a saturable reactor, the inductance of which is controlled by the amount of control current fed to the control winding 37 thereof from the output of low pass filter 23, which is the output of the clutter control channel. The inductor 35 and resistor 31 are proportioned so that in the absence of current in the control winding 37, the frequency response of the filter would be the same as that of the filter 9 shown in FIGURE 2. Clutter signals will cause the inductance of 35 to decrease, thus raising the cutoff frequency (or the lower frequency limit) of the filter sufficiently so that the clutter signal is kept out of the target signal channel. The voltage across inductor 35 is applied to an amplifier 39 and thence to a low pass filter comprising a series resistor 41 and a shunt capacitor 43. The combination of the low pass filter 41, 43 and the high pass filter 31, 35 comprises the variable bandpass filter. The values of 41 and 43 are chosen to produce the fixed upper frequency limit of approximately 9,500 Hertz, as shown in FIGURE 2. The amplifier 39 in addition to producing gain, decouples the high and low pass filters from each other. The fixed filter 9 of FIGURE 1 may be similar to the filter of FIGURE 5, but with fixed elements. It should be noted that saturable reactor comprising windings 35 and 37 are shown in schematic form only. In practice the windings 33 and 37 would be applied to a two-window core with the control winding 37 on the center leg of the core, and the winding 35 on the two outer legs. Instead of a variable reactor, the lower frequency limit of the filter may be controlled by varying the resistance of 31. This can be accomplished by utilizing a resistor 31 of semiconductor material, which has a high temperature coefficient of resistance, and applying the control signal from low pass filter 23 to a heating element adjacent to the resistor 31. The change in resistance then produces the required change in the response of the filter.

While the invention has been described in connection with illustrative embodiments, the inventive concepts disclosed herein are of general application, hence the invention should be limited only by the scope of the appended claims.

What is claimed is:

1. A Doppler radar set having means to actuate an alarm when moving targets enter the beam of said set, comprising, means to derive Doppler frequency signals from moving targets and moving clutter within said beam, a target signal channel and a clutter control channel, means, to apply said Doppler signals in parallel to both said channels, said target signal channel being tuned to a band of frequencies representing the Doppler shifts of desired targets and said clutter control channel being tuned to a band of frequencies below that of said target signal channel, said means to actuate an alarm being connected in said target signal channel, and means to de-sensitize said target signal channel in response to output from said clutter control channel, and wherein said target signal channel includes a threshold circuit with a control input for automatically changing the threshold thereof and wherein said means to de-sensitize said target signal channel comprises a connection from the output of said clutter control channel to the control input of said threshold circuit.

2. A Doppler radar set having means to actuate an alarm when moving targets enter the beam of said set, comprising, means to derive Doppler frequency signals from moving targets and moving clutter within said beam, a target signal channel and a clutter control channel, means to apply said Doppler signals in parallel to both said channels, said target signal channel being tuned to a band of frequencies representing the Doppler shifts of desired targets and said clutter control channel being tuned to a band of frequencies below that of said target signal channel, said means to actuate an alarm being connected in said target signal channel, and means to de-sensitize said target signal channel in response to output from said cutter control channel, and wherein said target signal channel comprises a variable bandpass filter including a control input for automatically changing the lower frequency limit of the bandpass thereof, said variable bandpass filter normally being tuned to said band of frequencies, and wherein the output of said clutter control channel is connected to said control input.

References Cited
UNITED STATES PATENTS

| | | | |
|---|---|---|---|
| 3,111,657 | 11/1963 | Bagno | 340—258 |
| 3,383,678 | 5/1968 | Palmer | 343—5 |

RODNEY D. BENNETT, JR., Primary Examiner

HERBERT C. WAMSLEY, Assistant Examiner

U.S. Cl. X.R.

340—258